US006745933B2

(12) United States Patent
Liphard

(10) Patent No.: US 6,745,933 B2
(45) Date of Patent: Jun. 8, 2004

(54) METHOD FOR PROVIDING A PRE-SECURITY DEPOSITORY

(76) Inventor: Robin G. Liphard, 2922 Riggie, Midland, MI (US) 48640

( * ) Notice: Subject to any disclaimer, the term of this patent is extended or adjusted under 35 U.S.C. 154(b) by 39 days.

(21) Appl. No.: 10/164,206

(22) Filed: Jun. 5, 2002

(65) Prior Publication Data

US 2003/0226883 A1 Dec. 11, 2003

(51) Int. Cl.[7] .............................................. B65D 91/00
(52) U.S. Cl. ...................... 232/1 R; 177/25.15; 705/23; 705/407
(58) Field of Search ......................... 705/23, 407, 414; 232/1 R; 177/25.15; 222/77

(56) References Cited

U.S. PATENT DOCUMENTS

| 3,692,988 | A | * | 9/1972 | Dlugos et al. .............. 705/407 |
| 4,274,500 | A | * | 6/1981 | Kuhnle ..................... 177/25.15 |
| 4,423,486 | A | * | 12/1983 | Berner ....................... 705/416 |
| 4,836,352 | A | * | 6/1989 | Tateno et al. ................ 194/215 |
| 4,852,676 | A | * | 8/1989 | Futakata ...................... 177/245 |
| 4,923,022 | A | * | 5/1990 | Hsieh ............................. 177/4 |
| 4,940,887 | A | * | 7/1990 | Sheng-Jung ................. 235/381 |
| 5,065,000 | A | * | 11/1991 | Pusic .......................... 235/381 |
| 5,313,404 | A | * | 5/1994 | Wu ............................. 700/227 |
| 5,831,220 | A | * | 11/1998 | Ramsden et al. .............. 177/1 |
| 6,119,622 | A | * | 9/2000 | Banerjea ..................... 116/202 |
| 6,477,514 | B1 | * | 11/2002 | Gil et al. ..................... 705/410 |

* cited by examiner

Primary Examiner—William L. Miller
(74) Attorney, Agent, or Firm—McKellar Stevens, PLLC; Robert L. McKellar

(57) ABSTRACT

A method for providing a pre-security deposit for an article and a selection station to aid in the method. The method comprises utilizing a selection station having a secure depository bin located in it wherein the selection station contains in it the combination of at least the components: a weighing scale, a device for disclosing the weight of the article, a device for selecting and providing a container for the article, a device for calculating payment for deposit of the article based on the weight of the article and for the container, and a device for making payment for the deposit of the article and the container.

20 Claims, 2 Drawing Sheets

METHOD FOR PROVIDING A PRE-SECURITY DEPOSITORY

BACKGROUND OF THE INVENTION

In view of the situation regarding terrorism throughout the world, it has been commonplace to increase security efforts at those places where large crowds of people are intended to congregate. Still further, security has been enhanced for those situations where large crowds are essentially captured and have no way of defending themselves in the event of a terrorist attack or an attempt at terrorism, such as in air travel, bus travel, train travel, and the like.

The enhancement of security automatically means that there are long delays for those trying to access aircraft, trains and busses, and the reason for the delays have to do with the personal side of the security effort, that is, the searching of luggage and the person prior to boarding the airplane, train or bus.

Many times, preliminary searches are carried out on persons resulting in the need to remove some item, or several items from the person, or the luggage before the person and his or her luggage is allowed to move through the security check points.

When the removed items tend to be minor articles, such as toy guns, souvenir swords, glass bottles of cologne configured as a gun, knife or sword, then the person in possession of such an item is in a position of having to leave such items behind, generally to the extent that the items are discarded.

However, many times, the item or items tend to be expensive, such as pocket knives, jewelry, electronic equipment and the like, for example, a small, hand-held electronic device that has failed the security check point because the batteries failed and it has become inoperable. Being inoperable means that the device will not be allowed past the security check point because in order to pass through the security check point, the item in question must be shown to be operable.

The persons in possession of such items have no choice but to leave the items behind, i.e., usually pass it over to the security people in the pre-security area, or throw it away, or destroy it completely.

There is no simple, easy, economical method by which these items can be sent back home, or sent on by mail or package delivery, because of the lack of such a service in the pre-security area mentioned Supra, or simply because of the lack of time to try to purchase a container for the item, label it correctly, provide the required postage or delivery fee, and make it unto the air flight, train, or bus in an appropriate time frame. Furthermore, there is no short term place that an individual can leave such items until their return, and evenso, these places would only be effective if the passenger were returning from their travels via exactly the same route as they left on their travels, at least to the extent that they would pass by the same stopover so that the item or items could be recovered.

What is needed therefore is a simple, easily utilized, economical method by which the items mentioned above, can be securely deposited while in the pre-security area of the airport, train station, or bus station, and eventually, and timely, be delivered to the destination or home of the person utilizing such a service.

The inventor herein has provided such a service, and the equipment by which one can take advantage of the service in a timely manner, and thereby not have to leave expensive or precious items behind or be forced to limit their travels.

THE INVENTION

This invention deals with a method for providing a pre-security deposit for an article and a selection station to aid in said method.

The method comprises utilizing a selection station having a secure depository bin located in it wherein the selection station contains in it the combination of at least the components: a weighing scale, a device for disclosing the weight of the article, a device for selecting and providing a container for the article, a device for calculating payment for deposit of the article based on the weight of the article and for the container, and a device for making payment for the deposit of the article and the container. Utilizing the selection station just described, the user then weighs the article on the weighing scale and selects and obtains a container for the article from the device for selecting and providing the container. The amount of the payment for the deposit of the article, which is based on the weight of the article, and the amount of payment for the container are then calculated, and payment that is required is made by using a device for making such payments provided by the selection station and then, the labeled container is placed in the secure depository bin located inside of the selection station.

The selection station for providing the pre-security deposits of articles in a secure depository, is comprised of a combination of a housing, wherein the housing has four sidewalls and each of the sidewalls has a top edge. There is a countertop surmounting the top edges of the four sidewalls covering the housing.

Located within the housing is a weighing scale recessed in a portion of the countertop, for example, and the weighing scale is accessible by a person using the selection station. There is a device for selecting and providing a container for the article and a device for disclosing the weight of the article. Also located in the housing, or surmounted thereon, is a device for calculating payment for the deposit of the article and for payment for the container, along with a device for making the required payments.

DETAILED DESCRIPTION OF THE INVENTION

Figure 1:
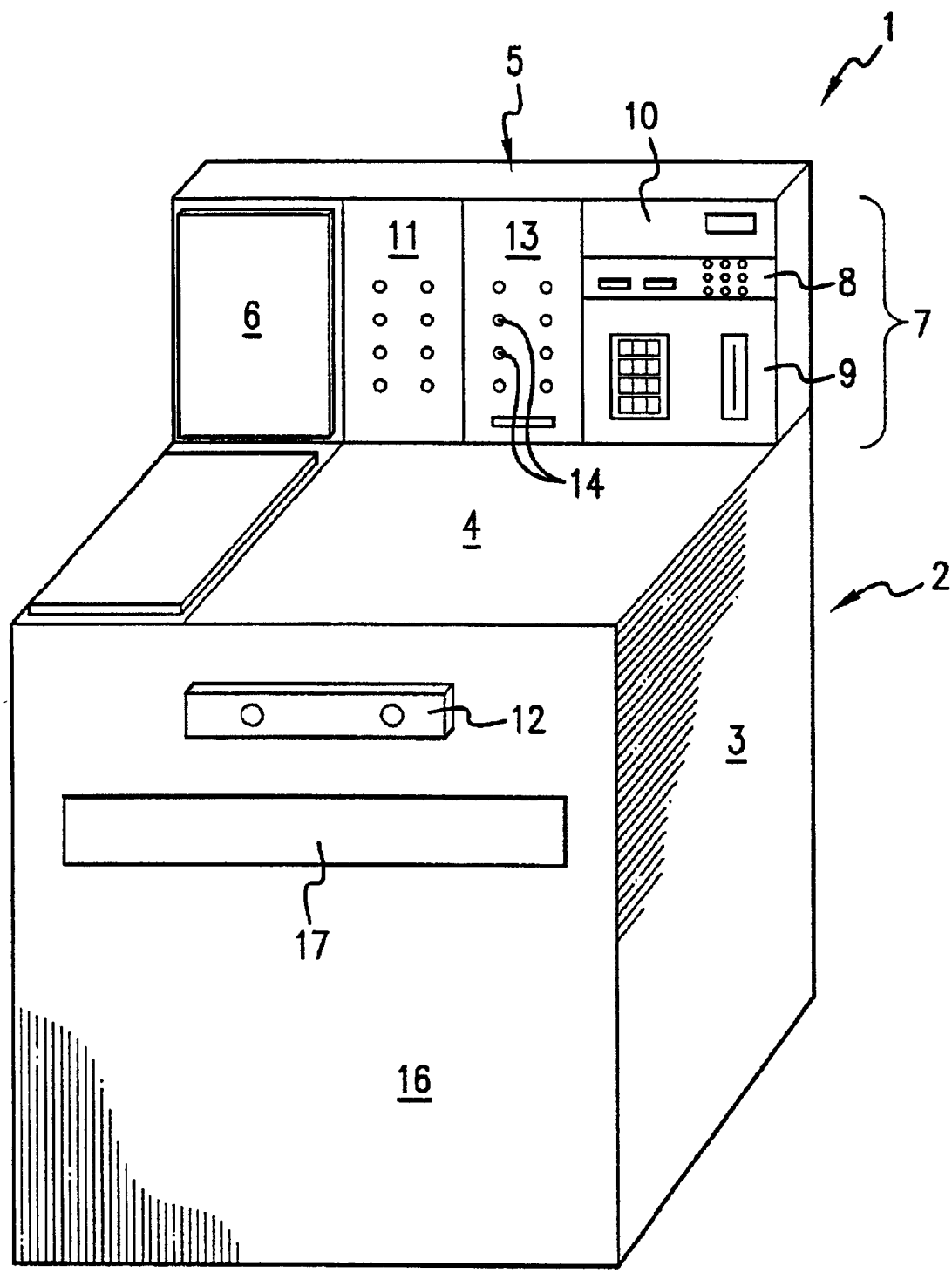
FIG. 1 is an illustration in perspective of one configuration of the selection station of this invention.

With regard to FIG. 1, there is shown an illustration of one configuration of a selection station 1 of this invention.

There is further shown the housing 2, showing two of the sidewalls, a side sidewall 3, and a front sidewall 16, and a countertop 4 surmounted on the top edges of the housing 2. In this configuration, there is a top credenza 5, which, for convenience and ease of use by the user, houses some of the components of this invention, although it is contemplated within the scope of this invention to house all of the associated components in the housing 2. It is intended by the inventor herein to vary the housing and housing components of the selection station 1 to accommodate style, color, size, usefulness to the user, and the like, without departing from the essence of the invention as claimed herein. It is also contemplated within the scope of this invention not to have a countertop 4 at all, but to house the selection station 1 in a vertical wall of the facility where it is being utilized.

On the front of the credenza 5 there is shown an area 6 for the display of the results from the weighing of the article, which may be a digital display that is electronically coordinated with the weighing scale 15 discussed infra, or a printed chart that shows the conversion of the weight to postage or postage to weight, as the case may be, or in the case of a package delivery service, the cost of the delivery based on weight and/or destination, or both.

Further shown in the credenza 5 is a device 7 for paying for the selection station deposit services and/or postage and/or package delivery service. Depending on the type of delivery being purchased, the device can be a postage delivery meter as illustrated at 8, or it can be a credit card payment set up as illustrated at 9, or it can be a cash purchase set up as illustrated at 10.

In this configuration, the center section of the credenza 5 illustrates an area 11 for container selection along with a container delivery drawer or section 12. Also illustrated in the center section of the credenza 5 is a device 13 for selecting and providing a label for the container. The label selecting device 13 has the capability of accepting information from the user by a series of buttons 14 as illustrated, or the device can be a computer screen that has the capability of accepting information from the user, so that a printed label will result.

Also shown as one of the components of the selection station 1 is a weighing scale 15, which as shown is recessed in the top of the countertop 4, and the weighing scale 15 is easily accessible for the user.

On the front sidewall 16 of the housing 2 there is illustrated a slot 17 for depositing the containers in the selection station 1.

Figure 2:
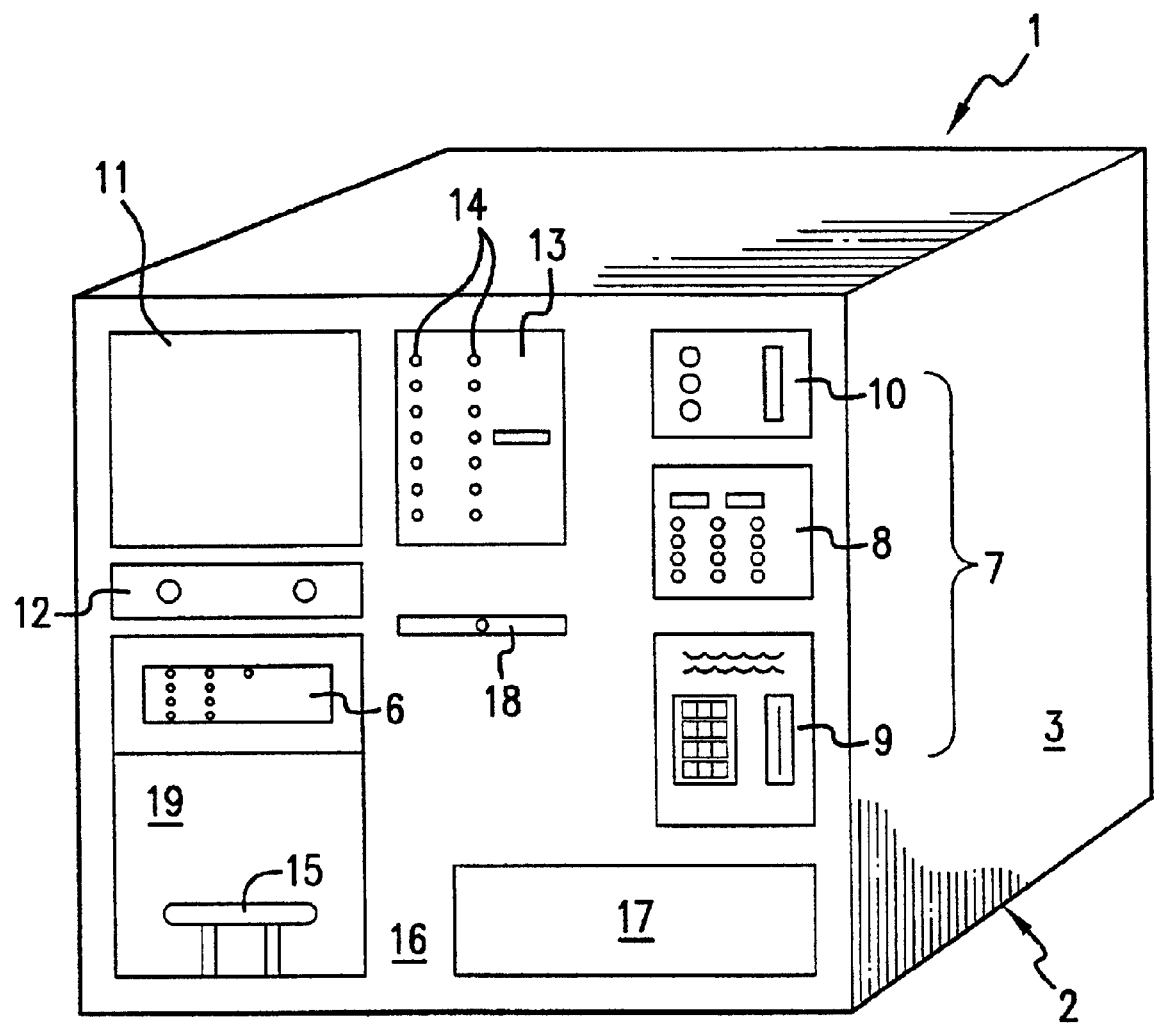
FIG. 2 is an illustration in perspective of a selection station of this invention that is intended to be inserted into an opening in a vertical wall.

Turning now to FIG. 2, which is an illustration of a selection station 1 of this invention that is insertable into a vertical wall, that is intended to be placed in the pre-security area in an airport, train station, or bus terminal.

There is shown the selection station 1, the housing 2, the side sidewall 3, the area of the postage display 6, the payments area 7, the postage delivery area 8, the credit card payment area 9, the cash payment area 10, the container selection area 11, the collection point for the containers selected 12, the label selection area 13, the buttons for the label selection area 13, the weighing scale 15, which is inserted into an opening 19, the front sidewall 16, the container depository 17, and a location 18 for receiving containers.

In use, one wishing to utilize the selection station 1 would place their item on the weighing scale 15, which for illustration purposes is a digital read out scale, and observe the weight of the item from 6. The user would then select a container using the device provided by 11, that would be the appropriate size for the item, collect the container from collection point 12, place the item in the container, select or input into the label selection device 13 to obtain a label and place the label on the container. The user would then select the appropriate payment for the type of service being used, from any of 7, and make the appropriate payments through device 8, 9, or 10, wherein, the correct postage, or the correct receipt for the payment would be provided by the payment device 7, and then after the postage was affixed to the container, or the receipt was received for the package delivery service, the container would be deposited in the secure depository bin of the selection station 1.

Thereafter, the collection service would collect the item on a timely basis and re-deposit it in the appropriate delivery service provider, such as the United States Postal Service, or any one of the requested worldwide package delivery services. It is contemplated within the scope of this invention for the provider of the selection service station to also provide the delivery service.

What is claimed is:

1. A method for providing a pre-security deposit for an article, said method comprising:
    (I) utilizing a selection station having a secure depository bin located therein, containing in combination at least the following components:
        i a weighing scale;
        ii a weight disclosing device, disclosing the weight of the article;
        iii a selection device for selecting a container for the article;
        iv a device for providing the container;
        v a calculator for calculating payment for deposit of the article based on the weight of the article, and for the container;
        vi a device for making payment for the deposit of the article and the container,
    (II) weighing the article on the weighing scale;
    (III) selecting and obtaining the container for the article from the devices for selecting and providing the container;
    (IV) calculating the amount of the payment for the deposit of the article based on the weight of the article, and the amount of payment for the container;
    (V) making the payment required by (IV) using the device for making payment provided by the selection station and,
    (VI) placing the article in the container and depositing the container in the secure depository bin.

2. A method as claimed in claim 1 wherein the weighing scale is electronic and discloses the weight of the article and the amount of payment based on the weight of the article.

3. A method as claimed in claim 2 wherein in addition, the weighing scale, or a device associated therewith provides postage for mailing the article.

4. A method as claimed in claim 1 wherein the device for calculating payment for the article is a printed chart.

5. A method as claimed in claim 4 wherein there is a device for the user of a selection station to provide information for the label, and the label is automatically provided by such device that is associated with the selection station.

6. A method as claimed in claim 1 wherein, in addition, there is provided a device to provide a label for the container.

7. A selection station for providing pre-security deposits of articles in a secure depository, said selection station comprising in combination
    i a housing, said housing having four sidewalls each having a top edge and, a countertop surmounting the top edges of the four sidewalls;
    and located within the housing:
        ii a weighing scale recessed in a portion of the countertop and accessible by a person using the selection station;
        iii a device for selecting and providing a container for the article;
        iiii a device for disclosing the weight of the article;
        v a device for calculating payment for the deposit of the article based on the weight of the article and for payment for the container;
        vi a device for making said payments.

8. A selection station as claimed in claim 7 wherein the weighing scale is electronic and discloses the weight of the article and the amount of payment is based on the weight of the article.

9. A selection station as claimed in claim 8 wherein in addition, the weighing scale, or a device associated therewith provides postage for mailing the article.

10. A selection station as claimed in claim 7 wherein the device for calculating payment for the article is a printed chart.

11. A selection station as claimed in claim 7 wherein, in addition, there is provided a device to provide a label for the container.

12. A selection station as claimed in claim 11 wherein there is a device for the user of the selection station to provide information for the label, and the label is automatically provided by such device that is associated with the selection station.

13. A method of providing a pre-security deposit for an article the method comprising:
  A. providing a selection station for access by persons needing to deposit a container containing the article in a secure depository prior to entry into a security operation;
  B. providing a regular collection service for timely collecting the containers from the secure depository;
  C. timely depositing said containers with a delivery service that provides delivery of the containers to the addresses provided on the containers, wherein the selection station has a secure depository bin located therein, containing in combination at least the following components:
  i a weighing scale:
  ii a weight disclosing device, disclosing the weight of the article;
  iii a selection device for selecting a container for the article;
  iv a device for providing the container;
  v a calculator for calculating payment for deposit of the article based on the weight of the article, and for the container;
  vi a device for making payment for the deposit of the article and the container.

14. A method as claimed in claim 13 wherein the selection station has posted on its exterior, the regular collection times for collecting the containers, deposited therein.

15. A method as claimed in claim 13 wherein the delivery service is the United States Postal Service.

16. A method as claimed in claim 13 wherein the delivery service is a worldwide guaranteed package delivery service.

17. A method as claimed in claim 13 wherein the delivery service is the service that provides the selection station to the pre-secure area.

18. A method as claimed in claim 17 wherein the pre-secure area is in an airport, pre-boarding security area.

19. A method as claimed in claim 17 wherein the pre-secure area is in a train station, pre-boarding security area.

20. A method as claimed in claim 17 wherein the pre-secure area is in a bus station, pre-boarding security area.

* * * * *